United States Patent [19]

Bousquet

[11] Patent Number: 5,178,030
[45] Date of Patent: Jan. 12, 1993

[54] NON-RECIRCULATING ROTARY BALL ACTUATOR

[75] Inventor: Jacques Bousquet, Figeac, France
[73] Assignee: Ratier-Figeac, Figeac, France
[21] Appl. No.: 718,379
[22] Filed: Jun. 20, 1991

[30] Foreign Application Priority Data

Jun. 29, 1990 [FR] France ............................ 90 08215

[51] Int. Cl.⁵ ............................................ F16H 55/18
[52] U.S. Cl. ........................... 74/424.8 NA; 74/89.15; 74/99 A; 92/31
[58] Field of Search ......... 74/424.8 NA, 99 A, 89.15, 74/424.8 R; 92/31

[56] References Cited

U.S. PATENT DOCUMENTS 2,739,491 3/1956 Russell ........................ 74/424.8 NA
4,643,401 2/1987 Benton ....................... 74/424.8 R X
4,691,582 9/1987 Weyer .................... 74/424.8 NA X Primary Examiner—Richard Lorence
Assistant Examiner—Khoi Q. Ta
Attorney, Agent, or Firm—Finnegan, Henderson, Farabow, Garrett & Dunner

[57] ABSTRACT

A rotary ball actuator has a piston mounted within a body consisting of a first portion and a second portion. The piston has helical ramps which cooperate by means of first balls with helical ramps formed within the first portion, and rectilinear ramps which cooperate by means of second balls with rectilinear ramps formed within the second portion. The first balls and second balls are held respectively within first and second ball cages interposed between the piston and the body and controlled in dependence on the movement of the piston by means of a device comprising a stud and helical ramp. The two cages can be combined into one.

8 Claims, 5 Drawing Sheets

FIG_1

FIG._2

FIG_3 PRIOR ART

NON-RECIRCULATING ROTARY BALL ACTUATOR

BACKGROUND OF THE INVENTION

1. Field of the Invention

The invention relates generally to the devices for controlling coaxial output elements which are capable of pivotal displacement with respect to each other such as the control surfaces of an airplane with respect to the wings, and more particularly rotary ball actuators.

2. Description of the Prior Art

It is in fact known that the increasing speeds of airplanes (supersonic fighter aircraft) and stealth (insensitivity to radar detection) call for continuous surfaces or in other words surfaces without any projecting portions in order to cause the least possible disturbance to the aerodynamic flow.

In order to achieve this result, three families of solutions are in use: the epicyclic-gear rotary actuators; the vane-type hydraulic rotary actuators; and the ball-type rotary actuators.

The first family poses problems of rigidity, chiefly if it is desired to have a high torque in a thickness having the lowest possible value.

The second family poses problems of leakage (therefore of efficiency).

The third family, namely of ball-type rotary actuators ("rotary ball actuators"), offers substantial advantages in regard to efficiency, rigidity and service life.

However, taking account in particular of high loads and vibrations, correct operation of a rotary ball actuator depends on the need to ensure that the balls do not accumulate along their tracks.

With this object in view, one design approach has led to the construction of recirculating-ball actuators as described in U.S. Pat. No. 4,134,329 granted to the present Applicant (the teachings of which are incorporated in the present Application), or in U.S. Pat. No. 4,738,415. An actuator of this type usually proves satisfactory. Reference can also be made to the article entitled "Rotary Servohinge Actuator" by George Miller Jr. and Mark Williams, published in SAE Technical Paper Series in 1989 (ISSN 0148-7191) and illustrating a more elaborate version of a recirculatingball rotary actuator.

However, the recirculating-ball circuit is attended by two relatively undesirable consequences: an increase in the number of balls and an increase in width of the actuator, thus resulting in increased weight.

In patent No. EP-A-151 788, it was proposed to dispense with the recirculating-ball circuit and to replace it by a design consisting in particular of an intermediate sleeve which serves to mount two helical ball tracks in superposed relation. This design provides only a partial solution to the weight problems mentioned above and, in addition, involves technical difficulties from the point of view of construction.

The object of the invention is to obtain a rotary actuator with non-recycled balls, which is not subject to the disadvantages mentioned above and permits a significant reduction of overall size and weight.

SUMMARY OF THE INVENTION

The invention proposes a rotary ball actuator of the type comprising a piston mounted within a hollow cylindrical body constructed in two portions locked translationally and freely rotatable with respect to each other, the piston being provided on its cylindrical peripheral surface opposite to the first portion with helical ramps adapted to cooperate by means of first balls with helical ramps formed within said first portion, and opposite to the second portion with rectilinear ramps adapted to cooperate by means of second balls with rectilinear ramps formed within said second portion so that a thrust exerted on the piston whilst one of said portions of the body is stationary produces a pivotal displacement of the other portion. In accordance with the distinctive feature of the actuator, the first balls and second balls are held respectively within first and second ball cages interposed between the piston and the body. It is thus ensured that the balls are not liable to accumulate. The first and second balls as well as the first and second ball cages are preferably disposed substantially on the same virtual cylinder and in the line of extension of each other so as to avoid any overthickness.

In accordance with a very important feature of the invention, the first and second ball cages are preferably controlled in dependence on the movement of the piston so that the position of the balls is perfectly defined at each moment, even in the event of a considerable number of vibrations of the device in which the actuator is incorporated.

In an advantageous embodiment of this follow-up system, each ball cage has a cylindrical shell adapted to cooperate by means of a device comprising a stud and helical ramp with one of the two portions of the body.

As an advantageous feature, the helical ramp of the system is formed on the cylindrical shell of the ball cage.

In accordance with a particular arrangement, each ball cage has a castellated edge, the teeth of which penetrate into the recesses of the castellated edge of the other ball cage, each tooth being provided with a helical slot in cooperating relation with a stud rigidly fixed to a respective portion of the actuator body.

However, other alternative forms of construction of the follow-up system may be contemplated in order to effectively remove any need to carry out recycling of the balls.

In another even more advantageous embodiment, the first and second ball cages are formed by the first and second portions of a single cage.

This single cage has a cylindrical shell adapted to cooperate by means of a device comprising a stud and helical ramp with one of the two portions of the body which is in principle the moving portion.

The shell is provided with holes for receiving the balls of the helical and rectilinear ramps.

The holes provided in one of the two portions (preferably the portion assigned to the balls of the rectilinear ramps) provide axial guiding of the balls but not circumferential guiding so as to permit different angular displacement of the balls in each portion. Advantageously, the holes of the portion assigned to the rectilinear ramps are elongated in the circumferential direction.

DESCRIPTION OF THE PREFERRED EMBODIMENTS

Figure 3:
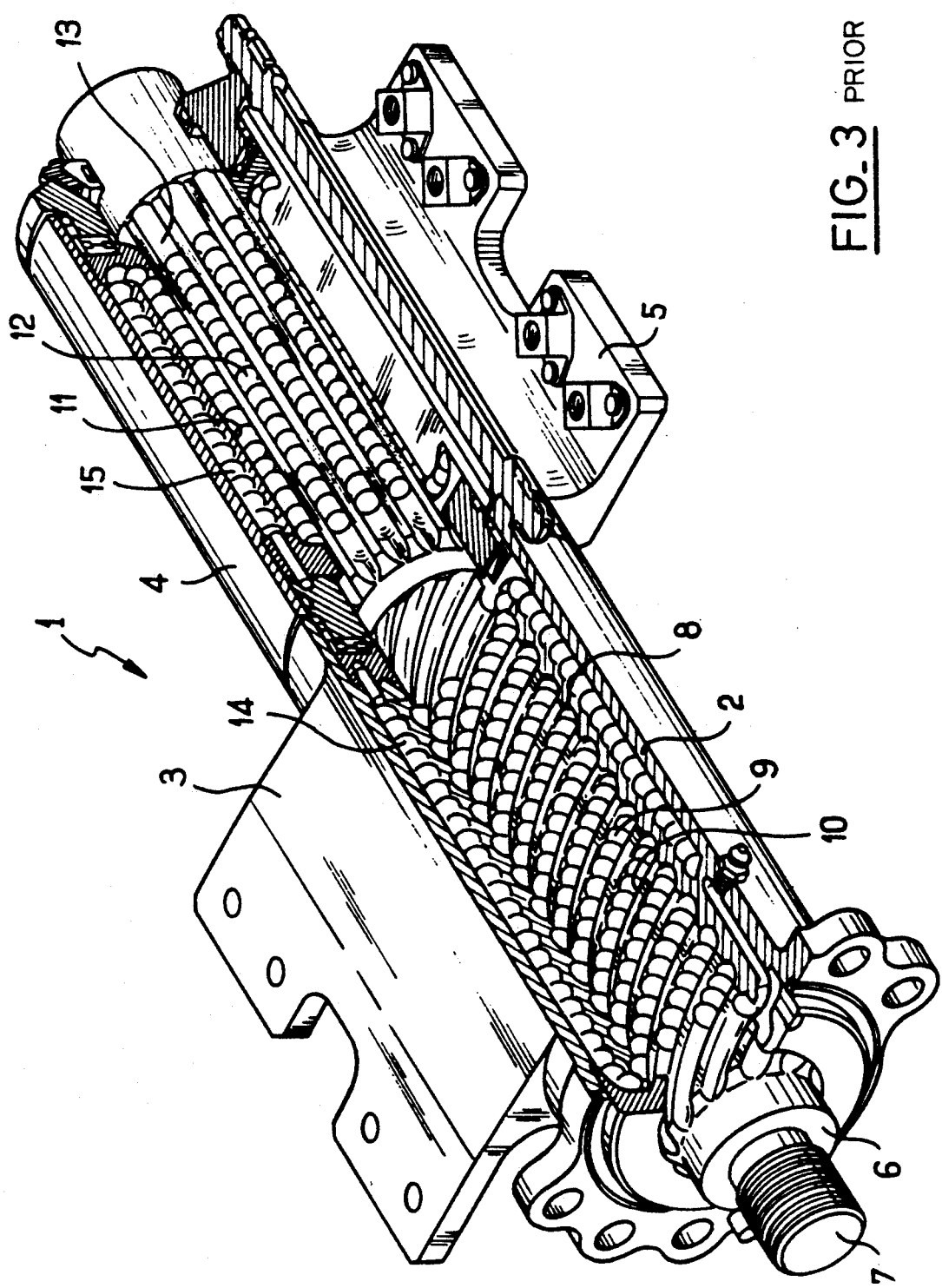
FIG. 3 is a fragmentary view in perspective showing a rotary actuator of the prior art, of the recirculating-ball type.

Reference being made to FIG. 3, we will first of all recall the general structure of a ball-type rotary actuator as shown in the aforementioned article entitled "Rotary Servohinge Actuator", this general structure being naturally used again in the actuator in accordance with the invention.

The actuator 1 has a stationary hollow cylindrical body 2 provided on its external surface with a member 3 for securing the body to the stationary portion of a wing unit (not shown) by making use of suitable fastening means.

A pivoting hollow cylindrical body 4 is placed coaxially in the line of extension of the stationary body 2 and is attached to a pivoting aerodynamic surface (not shown) by making use of a fastening member 5 and suitable fastening means. The pivoting body 4 is rotatably mounted with respect to the stationary body 2 and is locked translationally with respect to said stationary body.

A piston 6 is housed within the bodies 2 and 4 of the actuator 1 and has a head 7 forming an interface with a hydraulic control jack (not shown) which is intended to exert an axial thrust on the piston.

The stationary body 2 is provided with internal helical ramps 8 having suitable hardness and a suitable shape for the rolling motion of balls 9 which are held in position on the other side by corresponding helical ramps 10 formed on the opposite surface of the piston 6.

The pivoting body 4 has equidistant rectilinear tracks 11 of suitable hardness and shape for the rolling motion of balls 12 which are held in position on the other side by corresponding rectilinear tracks 13 formed on the opposite surface of the piston 6.

When the piston 6 receives an axial thrust, it undergoes a movement of translation with respect to the actuator bodies 2 and 4 and at the same time a movement of rotation with respect to the stationary body 2 under the screw-and-nut action which results from the cooperation of the helical ramps 8, 10.

By virtue of the fact that the body 4 is coupled for rotation with the piston 6 (by means of the rectilinear keying tracks) but locked translationally with respect to the stationary body 2, the induced helical motion of the piston 6 causes rotation of the pivoting body 4.

Since a system of this type is subjected to variable vibrations, loads and accelerations, the balls provided in the prior art design are placed in contiguous relation in a closed circuit having recirculation paths, 14 and 15 which the present invention is precisely intended to eliminate since they have the effect in particular of increasing the bulk of the actuator.

Owing to the fact that the balls cannot be left free without being liable to leave their normal position and interfere with the operation of the system, the invention proposes to introduce a ball cage for the balls of the helical and rectilinear tracks, as will be explained with reference to FIGS. 1 and 2.

In these figures, the elements corresponding to known elements of the prior art as illustrated in FIG. 3 are designated by the same reference numeral increased by 100.

Figure 1:
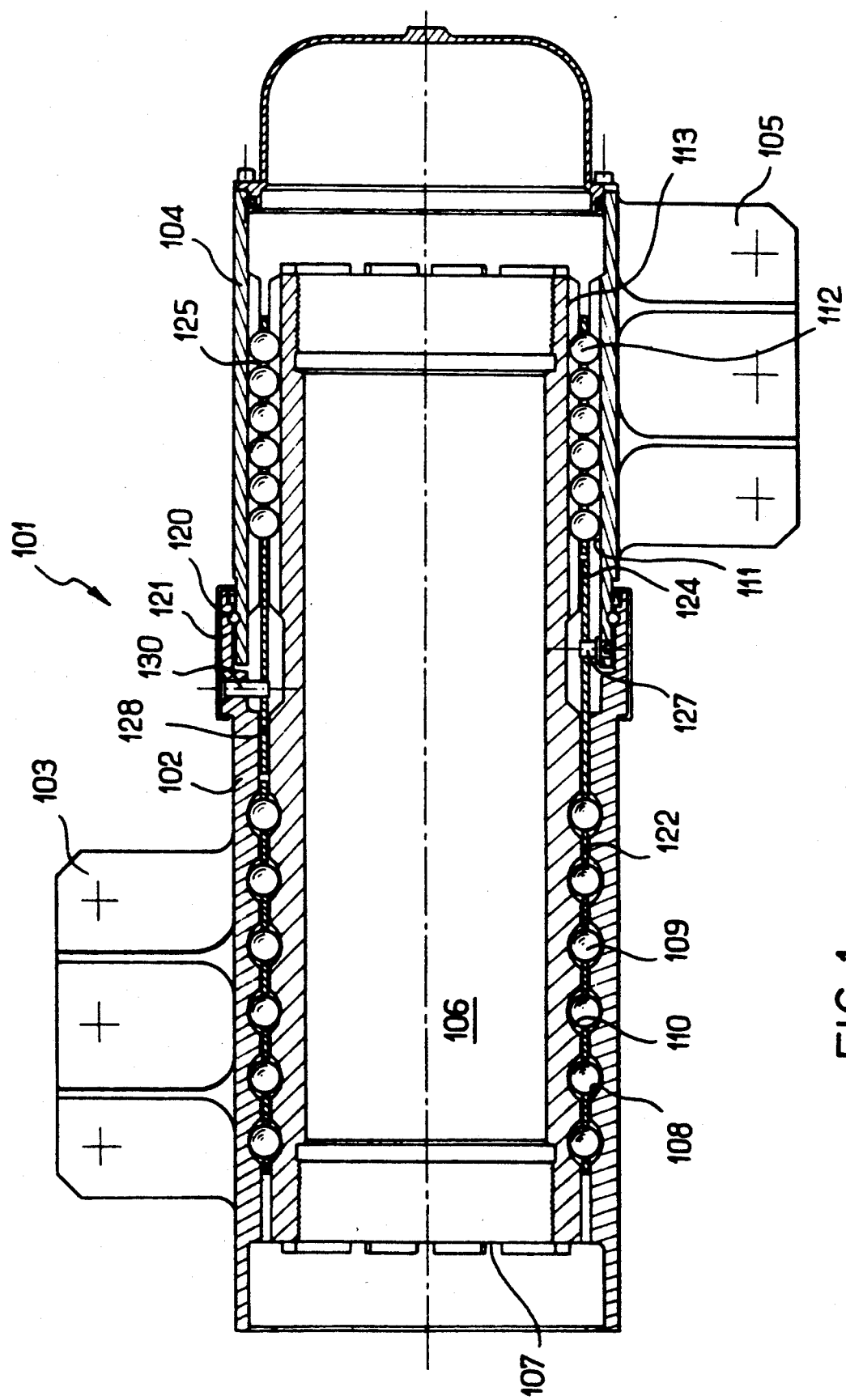
FIG. 1 is a view in two orthogonal axial half-sections showing an actuator in accordance with a first embodiment of the invention.

Accordingly, FIG. 1 shows the actuator 101 formed by the stationary body 102 and pivoting body 104 which are mounted so as to be free to rotate while being locked translationally by means of a ball-bearing 120 interposed between a cylindrical cramp 121 rigidly fixed to the body 102 and the external surface of the pivoting body 104 which is partly covered by said cramp 121.

The piston 106 is capable of receiving the control thrust on its face 107. The piston 106 is provided on the one hand with helical ramps 110 (for example eighteen ramps with a pitch of 360 mm) which cooperate by means of balls 109 with the helical ramps 108 of the body 102 and, on the other hand, with rectilinear tracks or ramps 113 (for example twenty-four tracks arranged in circumferentially spaced relation) adapted to cooperate by means of the balls 112 with the rectilinear tracks 111 of the pivoting body 104.

In accordance with the invention, the balls 109 of the helical ramps are held in fixed relationship by a ball cage 122 constituted by a thin-walled cylinder pierced with reception holes which are disposed in helices and in which the balls 109 are engaged. It is readily apparent that the presence of the ball cage 122 increases the total diameter of the actuator only to a very slight extent. The cylinder which forms the cage 122 terminates at that end of the piston 106 which is directed towards the rectilinear tracks in a castellated edge, the two recesses 123 of which separate two teeth 124. Their function will be explained hereinafter.

Similarly, the balls 112 of the rectilinear tracks are held within the aligned holes of a second ball cage 125 which is designed in the same manner as the first (except for the arrangement of the holes which is adapted to the configuration of the tracks). This ball cage is also provided with a castellated edge at the end which is directed towards the helical ramps. The castellated edges of the two cages are interengaged. The holes of the cages are slightly larger in size than the balls which they hold in position so as to permit rolling motion.

The movement of the cages is carried out in dependence on the movement of the moving elements in order to ensure strictly accurate positioning of the balls.

The first cage 122 is intended to carry out a helical movement such that the speed of forward travel and the speed of rotation are equal to one-half the speeds of forward travel and of rotation of the moving element with respect to the stationary element. To this end, the two teeth 124 of the cage 122 are provided with two helical ramps 126 (designed in the form of slots), said ramps being adapted to cooperate with two studs 127 which are rigidly fixed to the pivoting body 104. The angle of slope of the ramps 126 is calculated so as to ensure that the rotating movement of the stud 127 as it undergoes a displacement within the slot 126 induces the requisite speed of forward travel of the cage.

The second cage 125 is intended to move along a path which is also helical at a speed of forward travel which is one-half the speed of translational motion of the piston 106 with respect to the body 104 but at a speed of rotation equal to that of the body 104. To this end, the teeth 128 of the castellated edge of the cage 125 are provided with two helical slots 129, these slots being adapted to cooperate with two studs 130 which are rigidly fixed to the stationary body 102. The angle of slope of the slots 129 is such that, when the body 104 pivots and causes displacement of the cage 125, the stationary studs 130 exert a thrust on the slots so as to adjust the cage 125 to the requisite speed.

The teeth 124 of the first cage 122 penetrate into the castellated recesses 131 of the second cage (and conversely) at the level of the cramp 121 while leaving a sufficient circumferential spacing between the two cages to permit relative rotation of one with respect to the other; this is a necessary condition on account of the angular velocity of the cage 125 which is double that of the cage 122. The circumferential spacing is sufficient to enable the body 104 to carry out a limited movement of rotation with respect to the body 102.

Figure 4:
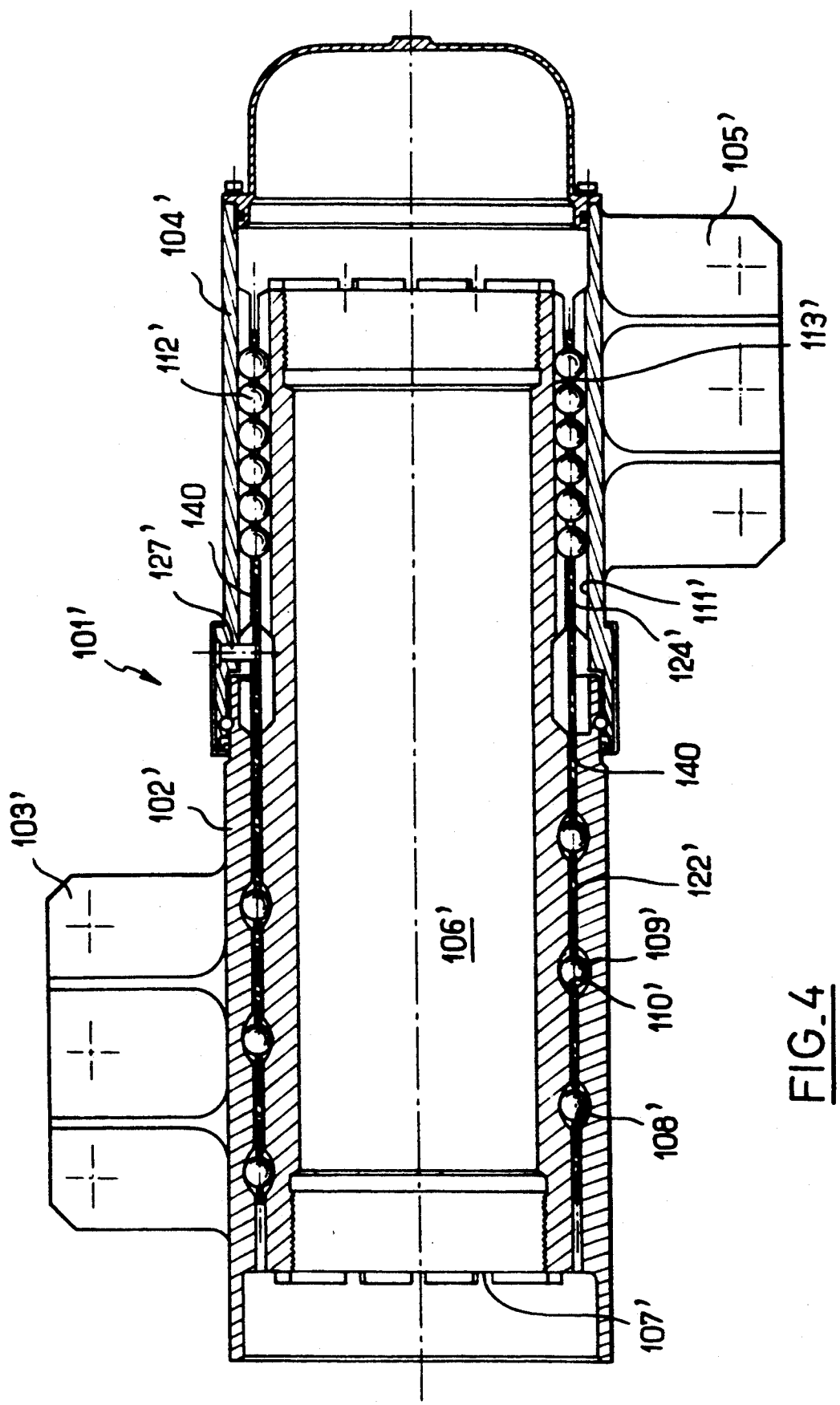
FIG. 4 is a view which is similar to FIG. 1 and shows a second embodiment of the invention.
Figure 5:
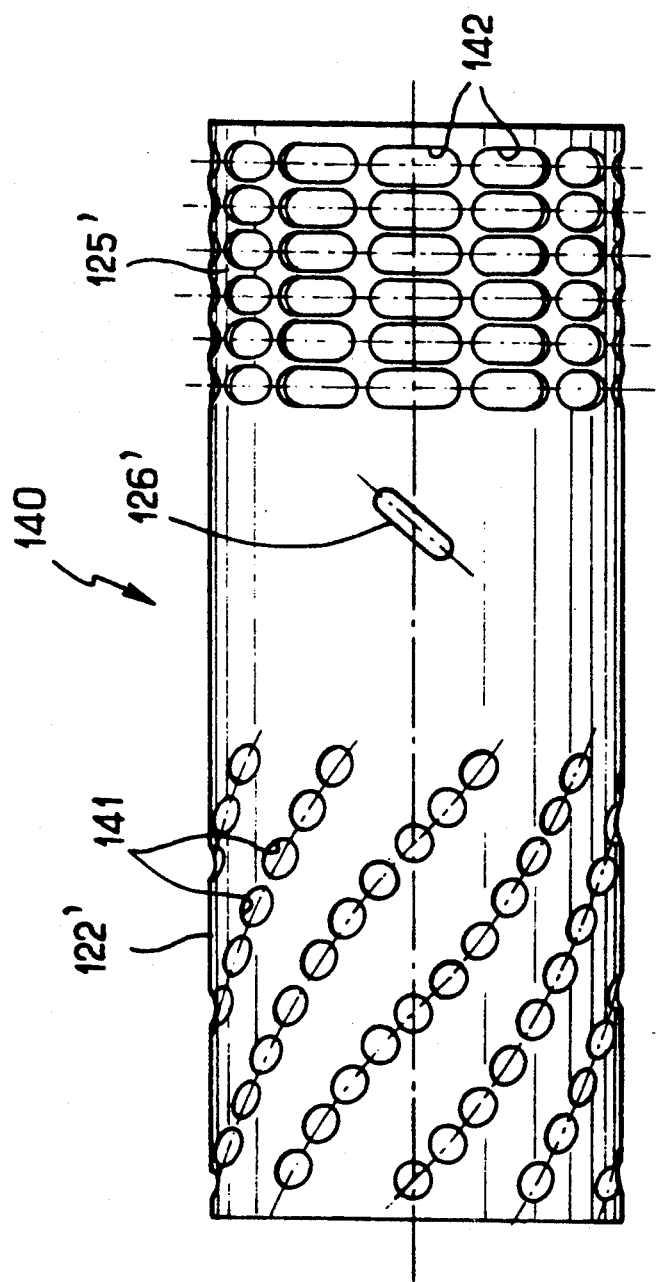
FIG. 5 is a front view of the single ball cage employed in the actuator of FIG. 4.

In FIGS. 4 and 5, there are shown the elements of a second embodiment of an actuator in which the two cages are combined into one.

However, in order to permit helical displacement of the balls of the longitudinal ramps at an angular velocity which is double that of the balls of the helical ramps, circumferentially oblong reception holes have been provided for the balls of the longitudinal ramps.

Figure 2:
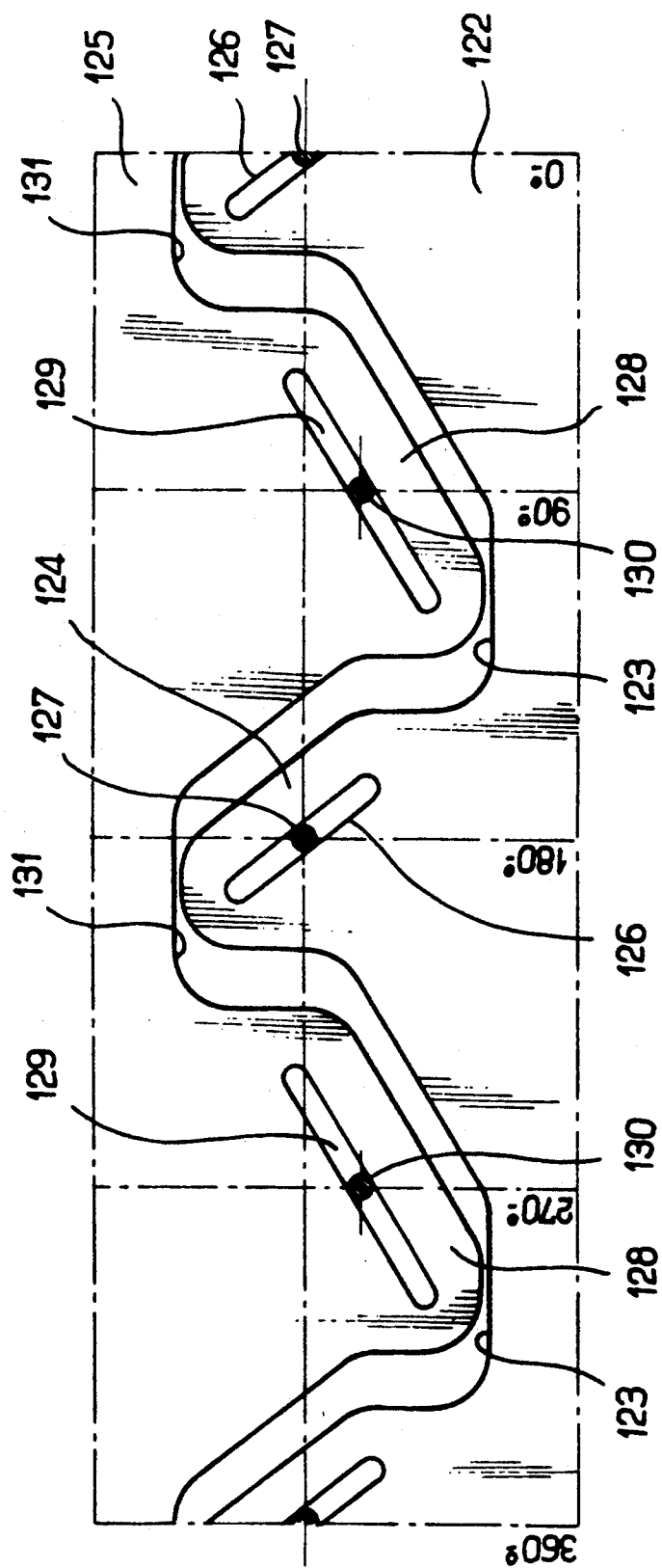
FIG. 2 is a developed view over 360° showing the interengaged cylindrical ends of the ball cages of the respectively helical and rectilinear tracks of the actuator of FIG. 1.

In these two figures, elements which are similar to those of FIGS. 1 and 2 are designated by a similar reference numeral followed by a prime index.

In this form of construction, the single cylindrical cage 140 (FIG. 5) groups together two portions 122' and 125' which are intended to guide respectively the balls 109' of the helical tracks 108'–110' and the balls 112' of the rectilinear tracks 111'–113'.

In the portion 122', the holes 141 for receiving the balls are substantially circular (apart from the curvature of the cylinder which forms the cage) and slightly larger than the balls 109'. As in the first embodiment, the holes are disposed along helices corresponding to the position of the balls 109' in the helical ramps.

On the other hand, the portion 125' has holes 142 which are elongated in the direction of the circumference of the cylinder whilst their width corresponds substantially to that of the balls 112'. As a result of this elongation of the holes, the angular velocity of the balls 112' during their helical displacement can have a different value (double the value) with respect to that of the single cage 140, the angular velocity of which is equal to that of the balls 109'.

The movement of the single cage 140 is carried out in dependence on at least one helical ramp 126' designed in the form of a slot, this slot being adapted to cooperate with at least one stud 127' which is rigidly fixed to the pivoting body 104'.

This form of construction has an advantage over the preceding embodiment in that it no longer calls for the relatively difficult operations involved in forming recesses in two separate ball cages at the level of their interengagement.

What is claimed is:

1. A rotary ball actuator of the type comprising a piston mounted within a hollow cylindrical body constructed in two portions locked translationally and freely rotatable with respect to each other, the piston being provided on its cylindrical peripheral surface opposite to a first portion with helical ramps adapted to cooperate by means of first balls with helical ramps formed within said first portion, and opposite to a second portion with rectilinear ramps adapted to cooperate by means of second balls with rectilinear ramps formed within said second portion, so that a thrust exerted on the piston whilst one of said portions of the body is stationary produces a pivotal displacement of the other portion, wherein the first balls and second balls are held respectively within first and second ball cages interposed between the piston and the body.

2. An actuator according to claim 1, wherein the first and second ball cages are controlled in dependence on the movement of the piston.

3. An actuator according to claim 2, wherein each ball cage has a cylindrical shell adapted to cooperate by means of a device comprising a stud and helical ramp with one of the two portions of the body.

4. An actuator according to claim 3, wherein said helical ramp of the system is formed on the cylindrical shell of the ball cage.

5. An actuator according to claim 4, wherein the ball cages are separate and each have a castellated body, the teeth of which penetrate into the recesses of the castellated edge of the other cage, each tooth being provided with a helical slot in cooperating relation with a stud rigidly fixed to a respective portion of the actuator body.

6. An actuator according to claim 1, wherein the first and second ball cages are formed by the first and second portions of a single cage.

7. An actuator according to claim 6, wherein the single cage has a cylindrical shell adapted to cooperate by means of a device comprising a stud and helical ramp with one of the two portions of the body.

8. An actuator according to claim 6, wherein the ball-receiving holes of one of the two ball-cage portions are elongated in the circumferential direction in order to permit different angular displacement of the received balls in each portion.

* * * * *